US012723005B2

(12) United States Patent
Kudoh

(10) Patent No.: US 12,723,005 B2
(45) Date of Patent: Sep. 1, 2026

(54) CUBIC BORON NITRIDE SINTERED BODY AND COATED CUBIC BORON NITRIDE SINTERED BODY

(71) Applicant: TUNGALOY CORPORATION, Fukushima (JP)

(72) Inventor: Takahide Kudoh, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 533 days.

(21) Appl. No.: 18/330,984

(22) Filed: Jun. 7, 2023

(65) Prior Publication Data

US 2024/0002295 A1 Jan. 4, 2024

(30) Foreign Application Priority Data

Jun. 30, 2022 (JP) ................................ 2022-105210

(51) Int. Cl.
*C04B 35/5831* (2006.01)
*C04B 41/87* (2006.01)

(52) U.S. Cl.
CPC .......... *C04B 35/5831* (2013.01); *C04B 41/87* (2013.01); *C04B 2235/386* (2013.01); *C04B 2235/402* (2013.01); *C04B 2235/5436* (2013.01); *C04B 2235/5445* (2013.01); *C04B 2235/762* (2013.01)

(58) Field of Classification Search
CPC .......... C04B 35/5831; C04B 2235/386; C04B 2235/5436; C04B 2235/5445; C04B 2235/762; C22C 2026/003
See application file for complete search history.

(56) References Cited

U.S. PATENT DOCUMENTS

| | | | | |
|---|---|---|---|---|
| 2014/0315015 | A1 | 10/2014 | Fukushima | |
| 2019/0076920 | A1* | 3/2019 | Ishii | B22F 1/12 |

FOREIGN PATENT DOCUMENTS

| | | | |
|---|---|---|---|
| CN | 110541102 | A | 12/2019 |
| JP | H09-136203 | A | 5/1997 |
| JP | 2014-214065 | A | 11/2014 |
| JP | 2021-151943 | A | 9/2021 |
| JP | 2022-069859 | A | 5/2022 |
| WO | 2013/069657 | A1 | 5/2013 |

* cited by examiner

*Primary Examiner* — Cameron K Miller
(74) *Attorney, Agent, or Firm* — Studebaker Brackett PLLC

(57) ABSTRACT

A cubic boron nitride sintered body including cubic boron nitride and a binder phase, wherein: a content of the cubic boron nitride is 81 volume % or more and 95 volume % or less and a content of the binder phase is 5 volume % or more and 19 volume % or less based on the total amount of the sintered body; and a content of Al in the binder phase is 0.5 mass % or more and 5 mass % or less, a content of W in the binder phase is 2 mass % or more and 10 mass % or less, a content of V in the binder phase is 2 mass % or more and 8 mass % or less, and a content of Cr in the binder phase is 0 mass % or more and 5 mass % or less, based on 100 mass % in total of all elements contained in the sintered body.

8 Claims, No Drawings

CUBIC BORON NITRIDE SINTERED BODY AND COATED CUBIC BORON NITRIDE SINTERED BODY

BACKGROUND OF THE INVENTION

Field of the Invention

The present invention relates to a cubic boron nitride sintered body and a coated cubic boron nitride sintered body.

Description of Related Art

Cubic boron nitride (hereinafter also referred to as "cBN") has hardness second only to diamond, and excellent thermal conductivity. Cubic boron nitride also has a characteristic of low affinity with iron as compared with diamond. Therefore, a cubic boron nitride sintered body containing cubic boron nitride and a binder phase of a metal or ceramic is used in a cutting tool or a wear resistant tool.

Since sintered metals have high moldability, and have a complicated shape in many cases, when they are processed with a tool, the tool is easily fractured by thermal shock. Besides, since sintered metals may contain hard particles in some cases, the tool is easily worn away. Therefore, cubic boron nitride is used in many cases of processing sintered metals, and in particular, many studies have been made on cubic boron nitride sintered bodies having a high cubic boron nitride content.

For example, Patent Publication JP-A-2021-151943 discloses a cBN sintered body containing 40 to 80 area % of the cBN, and a binder phase including a phase α and a phase β, wherein the phase α has an average composition of $(Ti_{1-x}V_x)(C_{1-y}N_y)$, wherein x=0.30 to 0.70 and y=0.00 to 0.50, and is contained in the binder phase in a ratio of 70 to 97 area %, the phase β is one of an oxide, a nitride, and a boride of Al having an average particle size of 0.05 to 0.40 μm, and is contained in the binder phase in a ratio of 3 to 20 area %, the phase α includes a region A and a region B, the region A being $(Ti_{1-xA}V_{xA})(C_{1-yA}N_{yA})$ wherein xA=0.10 to 0.30, and yA=0.00 to 0.50, the region B being $(Ti_{1-xB}V_{xB})(C_{1-yB}N_{yB})$ wherein xB=0.70 to 0.90, and yB=0.00 to 0.50, and a total area of the region A and the region B is 50 area % or more of the phase α.

For example, Patent Publication JP-A-H09-136203 discloses a high strength cBN-based sintered body containing 10 to 40 volume % of $(Ti_{1-x})(C_{1-y}, N_y)$ (wherein x is 0.1 to 0.4, and y is 0.1 to 0.5) (hereinafter referred to as component A), 2 to 10 volume % of one, two or more of a carbide, a nitride, and a carbonitride of Ti (hereinafter referred to as component B), 2 to 10 volume % of one, two or more of a carbide, a nitride, and a carbonitride of V (hereinafter referred to as component C), a total amount of the component B and the component C being 6 to 20 volume %, and the component A/the component B+the component C being 1.5 to 7, with the balance being cubic boron nitride; and a cBN-based sintered body further containing 1 to 10 volume % of one, two or more of $Al_2O_3$, AlN, and $AlB_2$ in a cutting tool made of the cBN-based sintered body (1).

For example, International Publication No. WO2013/069657 discloses a cubic boron nitride sintered body containing 85 to 95 volume % of cubic boron nitride, and 5 to 15 volume % of a binder phase and unavoidable impurities, wherein the binder phase contains three or more compounds selected from the group consisting of a carbide, a nitride, a carbonitride, and an oxide of an element selected from the group consisting of Al, V, Cr, Mn, Co, Ni, Nb and Mo, and a solid solution thereof, an amount of aluminum element contained in the cubic boron nitride sintered body is 0.5 to 5 mass % based on a total mass of the cubic boron nitride sintered body, and neither a simple metal nor an alloy is contained in the binder phase.

SUMMARY

Technical Problem

In recent years, higher efficiency is required in cutting processing, and hence high speed, high feeding speed, and deeper cutting depth are more remarkably required. In accordance with such a trend, a cubic boron nitride sintered body excellent in wear resistance and fracture resistance, and capable of providing long tool life is required also in high-speed processing of a sintered metal.

Under such circumstances, the cubic boron nitride sintered body disclosed in Patent Publication JP-A-2021-151943 has a low content ratio of cubic boron nitride in the cubic boron nitride sintered body, and wear resistance thereof is still insufficient. In the cubic boron nitride group sintered body disclosed in Patent Publication JP-A-H09-136203 and the cubic boron nitride sintered body disclosed in International Publication No. WO2013/069657, the binder phase does not contain W as a metal element in addition to Ti and V, and hence toughness is not sufficient in some cases, and fracture resistance is easily deteriorated.

The present invention has an object to provide a cubic boron nitride sintered body capable of extending the tool life by having excellent wear resistance and fracture resistance.

Solution to Problem

The present inventor has conducted studies about the extension of tool life and has accordingly found that the wear resistance and the fracture resistance thereof can be improved if a cubic boron nitride sintered body has a specific constitution, and as a result, the tool life can be extended. Finally, the present inventor has completed the present invention based on such findings. The gist of the present invention is as set forth below.

[1]

A cubic boron nitride sintered body comprising cubic boron nitride and a binder phase, wherein a content of the cubic boron nitride is 81 volume % or more and 95 volume % or less based on a total amount of the sintered body, a content of the binder phase is 5 volume % or more and 19 volume % or less based on the total amount of the sintered body, a content of Al in the binder phase is 0.5 mass % or more and 5 mass % or less based on 100 mass % in total of all elements contained in the sintered body, a content of W in the binder phase is 2 mass % or more and 10 mass % or less based on 100 mass % in total of all the elements contained in the sintered body, a content of V in the binder phase is 2 mass % or more and 8 mass % or less based on 100 mass % in total of all the elements contained in the sintered body, and a content of Cr in the binder phase is 0 mass % or more and 5 mass % or less based on 100 mass % in total of all the elements contained in the sintered body.

[2]

The cubic boron nitride sintered body according to [1], wherein, in the binder phase, a ratio of a content (volume %) of a first material S1 composed of a compound containing W to a total content (volume %) of the first material S1 and a second material S2 composed of a compound being free of W and containing V, (S1/(S1+S2)), is 0.35 or more and 1 or less.

[3]

The cubic boron nitride sintered body according to [2], wherein the total content (volume %) of the first material S1 and the second material S2 is 35 volume % or more and 97 volume % or less based on a total amount of the binder phase.

[4]

The cubic boron nitride sintered body according to any one of [1] to [3], wherein an average particle size of the cubic boron nitride is 0.5 μm or more and 3.0 μm or less.

[5]

A coated cubic boron nitride sintered body comprising the cubic boron nitride sintered body according to any one of [1] to [3] and a coating layer formed on a surface of the cubic boron nitride sintered body, wherein an average thickness of the coating layer is 0.5 μm or more and 5.0 μm or less.

Advantageous Effects of Invention

According to the present invention, a cubic boron nitride sintered body capable of extending the tool life by having excellent wear resistance and fracture resistance can be provided.

DETAILED DESCRIPTION

An embodiment for carrying out the present invention (hereinafter simply referred to as the "present embodiment") will hereinafter be described in detail. However, the present invention is not limited to the present embodiment described below. Various modifications may be made to the present invention without departing from the gist of the invention.

[Cubic Boron Nitride Sintered Body]

A cubic boron nitride sintered body according to the present embodiment is a cubic boron nitride sintered body including cubic boron nitride (hereinafter also referred to as "cBN") and a binder phase, wherein a content of the cBN is 81 volume % or more and 95 volume % or less based on a total amount of the sintered body, a content of the binder phase is 5 volume % or more and 19 volume % or less based on the total amount of the sintered body, a content of Al in the binder phase is 0.5 mass % or more and 5 mass % or less based on 100 mass % in total of all elements contained in the sintered body, a content of W in the binder phase is 2 mass % or more and 10 mass % or less based on 100 mass % in total of all the elements contained in the sintered body, a content of V in the binder phase is 2 mass % or more and 8 mass % or less based on 100 mass % in total of all the elements contained in the sintered body, and a content of Cr in the binder phase is 0 mass % or more and 5 mass % or less based on 100 mass % in total of all the elements contained in the sintered body.

The cubic boron nitride sintered body according to the present embodiment can improve, owing to the above-described constitution, wear resistance and fracture resistance and, as a result, can extend tool life.

The detailed reason why the cubic boron nitride sintered body according to the present embodiment improves wear resistance and fracture resistance of a tool to provide the tool with an extended tool life is not clear, but the present inventor considers the reason as follows. However, the reason is not limited thereto. Specifically, since the content of the cBN is 81 volume % or more in the cubic boron nitride sintered body of the present embodiment, a ratio of the binder phase is relatively low, and hence the hardness is improved, and the wear resistance is excellent. On the other hand, since the content of the cBN is 95 volume % or less in the cubic boron nitride sintered body of the present embodiment, the cBN particles can be inhibited from dropping off, and hence the wear resistance is excellent. In addition, surface roughness on a surface to be processed of a work material is reduced in cutting processing, and appearance obtained after the processing tends to be favorable.

Since the content of the binder phase is 5 volume % or more in the cubic boron nitride sintered body of the present embodiment, the cBN particles can be inhibited from dropping off, and hence the wear resistance is excellent. On the other hand, since the content of the binder phase is 19 volume % or less in the cubic boron nitride sintered body, a content ratio of the cBN is relatively increased to improve the hardness, and as a result, the wear resistance is excellent.

Since the content of Al in the binder phase of the cubic boron nitride sintered body of the present embodiment is 0.5 mass % or more, Al element reacts with oxygen atoms present on the surfaces of the cBN particles, resulting in inhibiting the cBN particles from dropping off. Since the content of Al in the binder phase of the cubic boron nitride sintered body of the present embodiment is 5 mass % or less, formation of Al nitride and Al boride is inhibited, and the wear resistance is excellent. Since the content of W in the binder phase of the cubic boron nitride sintered body of the present embodiment is 2 mass % or more, the binder phase is improved in the toughness, and hence the fracture resistance is excellent. On the other hand, since the W content is 10 mass % or less in the cubic boron nitride sintered body of the present embodiment, deterioration of the hardness of the binder phase is inhibited, and hence the wear resistance is excellent. Since the content of V in the binder phase is 2 mass % or more in the cubic boron nitride sintered body of the present embodiment, diffusion of W element in the entire binder phase can be accelerated, the toughness of the binder phase is improved, and hence the fracture resistance is excellent. On the other hand, since the V content is 8 mass % or less in the cubic boron nitride sintered body of the present embodiment, sinterability of the cubic boron nitride sintered body is improved. Since the content of Cr in the binder phase is 0 mass % or more, if the cubic boron nitride sintered body of the present embodiment contains Cr, an effect of improving the sinterability of the cubic boron nitride sintered body is obtained. On the other hand, since the Cr content is 5 mass % or less in the cubic boron nitride sintered body, the toughness of the binder phase is improved, and hence the fracture resistance is excellent.

Owing to a combination of these effects, the cubic boron nitride sintered body of the present embodiment can be improved in wear resistance and fracture resistance, and can extend tool life.

The cubic boron nitride sintered body of the present embodiment contains the cBN and the binder phase. The content of the cBN is 81 volume % or more and 95 volume % or less based on the total amount of the sintered body. The content of the binder phase is 5 volume % or more and 19 volume % or less based on the total amount of the sintered body. It is noted that the total content of the cBN and the binder phase in the cubic boron nitride sintered body of the present embodiment is 100 volume %.

[Cubic Boron Nitride (cBN)]

Since the content of the cBN is 81 volume % or more in the cubic boron nitride sintered body of the present embodiment, the ratio of the binder phase is relatively low, and hence the hardness is improved, and the wear resistance is excellent. On the other hand, since the content of the cBN is 95 volume % or less in the cubic boron nitride sintered body of the present embodiment, the cBN particles can be inhibited from dropping off, and hence the wear resistance is excellent. From a similar point of view, the cBN content preferably ranges 83 volume % or more and 93 volume % or less and more preferably ranges 85 volume % or more and 91 volume % or less.

In the cubic boron nitride sintered body according to the present embodiment, the cBN content and the binder phase content (volume %) can be determined by photographing an arbitrary cross-section with a scanning electron microscope (SEM) and analyzing the photographed structural photograph using commercially available image analysis software. Specifically, the content can be determined by a method disclosed in the Examples described below.

In the cubic boron nitride sintered body of the present embodiment, an average particle size of the cBN is preferably 0.5 μm or more and 3.0 μm or less. Since the average particle size of the cBN of the cubic boron nitride sintered body is 0.5 μm or more, the cBN particles can be inhibited from dropping off, and since the average particle size of the cBN is 3.0 μm or less, the mechanical strength is improved, and the fracture resistance tends to be excellent. From a similar point of view, the average particle size of the cBN is more preferably 0.5 μm or more and 2.5 μm or less, and further preferably 0.5 μm or more and 2.0 μm or less.

In the present embodiment, the average particle size of the cBN is determined, for example, in the following manner.

The cross-sectional structure of the cubic boron nitride sintered body is photographed with a SEM. The area of a cBN particle is obtained by analyzing the thus photographed cross-sectional structure, and then the diameter of a circle with an area equal to the thus obtained area is determined as the particle size of the cBN.

The average of a plurality of the cBN particles is determined as the average particle size of the cBN. The average particle size of the cBN can be determined using commercially available image analysis software from an image of a sectional structure of the cubic boron nitride sintered body. Specifically, the content can be determined by a method disclosed in the Examples described below.

[Binder Phase]

Since the content of the binder phase in the cubic boron nitride sintered body of the present embodiment is 5 volume % or more, the cBN particles can be inhibited from dropping off, and the wear resistance is excellent. On the other hand, since the content of the binder phase in the cubic boron nitride sintered body is 19 volume % or less, the content ratio of the cBN is relatively high, and hence the hardness is improved, resulting in excellent wear resistance. From a similar point of view, the content of the binder phase is preferably 7 volume % or more and 17 volume % or less, and more preferably 9 volume % or more and 15 volume % or less.

In the cubic boron nitride sintered body of the present embodiment, the content of Al in the binder phase is 0.5 mass % or more and 5 mass % or less based on 100 mass % in total of all the elements contained in the sintered body, the content of W in the binder phase is 2 mass % or more and 10 mass % or less based on 100 mass % in total of all the elements contained in the sintered body, the content of V in the binder phase is 2 mass % or more and 8 mass % or less based on 100 mass % in total of all the elements contained in the sintered body, and the content of Cr in the binder phase is 0 mass % or more and 5 mass % or less based on 100 mass % in total of all the elements contained in the sintered body.

In the cubic boron nitride sintered body of the present embodiment, since the content of Al in the binder phase is 0.5 mass % or more based on 100 mass % in total of all the elements contained in the sintered body, Al element reacts with oxygen atoms present on the surfaces of the cBN particles, resulting in inhibiting the cBN particles from dropping off. Since the content of Al in the binder phase of the cubic boron nitride sintered body of the present embodiment is 5 mass % or less, formation of Al nitride and Al boride is inhibited, and the wear resistance is excellent. From a similar point of view, the content of Al in the binder phase is preferably 0.5 mass % or more and 3.5 mass % or less, and more preferably 0.5 mass % or more and 2 mass % or less.

Since the content of W in the binder phase of the cubic boron nitride sintered body of the present embodiment is 2 mass % or more based on 100 mass % in total of all the elements contained in the sintered body, the binder phase is improved in the toughness, and hence the fracture resistance is excellent. On the other hand, since the W content is 10 mass % or less in the cubic boron nitride sintered body, deterioration of the hardness of the binder phase is inhibited, and hence the wear resistance is excellent. From a similar point of view, the content of W in the binder phase is preferably 2 mass % or more and 9 mass % or less, and more preferably 2 mass % or more and 8 mass % or less.

Since the content of V in the binder phase is 2 mass % or more based on 100 mass % in total of all the elements contained in the sintered body in the cubic boron nitride sintered body of the present embodiment, diffusion of W element in the entire binder phase can be accelerated, the toughness of the binder phase is improved, and hence the fracture resistance is excellent. On the other hand, since the V content is 8 mass % or less in the cubic boron nitride sintered body of the present embodiment, sinterability of the cubic boron nitride sintered body is improved. From a similar point of view, the content of V in the binder phase is preferably 2.5 mass % or more and 8 mass % or less, and more preferably 3 mass % or more and 8 mass % or less.

Since the content of Cr in the binder phase is 0 mass % or more based on 100 mass % in total of all the elements contained in the sintered body in the cubic boron nitride sintered body of the present embodiment, if Cr is contained, an effect of improving the sinterability of the cubic boron nitride sintered body is obtained. On the other hand, since the Cr content is 5 mass % or less in the cubic boron nitride sintered body, the toughness of the binder phase is improved, and hence the fracture resistance is excellent. From a similar point of view, the content of Cr in the binder phase is preferably 0 mass % or more and 4.4 mass % or less, and more preferably 0 mass % or more and 3.8 mass % or less.

The cubic boron nitride sintered body of the present embodiment may contain another element in the binder phase in addition to those described above. Non-limiting specific examples of another element include Ti, Zr, Nb, Mo, Hf, Ta, Mn, Fe, Co, and Ni, and Ti Mo, Ta, Co, and Ni are preferred, and Ti and Co are more preferred.

Such another element may be derived from, for example, a ball mill cylinder or ball, or a high-melting-point metal capsule used for filling, and may be unavoidably contained or intentionally added. The content of such another element is not especially limited, and may be, for example, 0 mass % or more and 10 mass % or less based on 100 mass % in total of all the elements contained in the sintered body.

In the binder phase used in the present embodiment, a ratio of the content (volume %) of a first material 51 composed of a compound containing W to a total content (volume %) of the first material 51 and a second material S2 composed of a compound being free of W and containing V, (S1/(S1+S2)), is preferably 0.35 or more and 1 or less. In the cubic boron nitride sintered body, since the ratio (S1/(S1+S2)) is 0.35 or more, the toughness of the binder phase is improved, and the fracture resistance tends to be excellent. From a similar point of view, the ratio (S1/(S1+S2)) is preferably 0.40 or more and 1 or less, more preferably 0.45 or more and 1 or less, and further preferably 0.76 or more and 1 or less.

Here, the compound constituting each of the first material S1 and the second material S2 preferably contains at least one selected from the group consisting of a carbide, a nitride, a boride, an oxide, and a solid solution of these, more preferably contains at least one selected from the group consisting of a carbide, a nitride, a boride, and a solid solution of these, and further preferably contains at least one selected from the group consisting of a carbide, a nitride, and a solid solution of these.

In the binder phase used in the present embodiment, the total content (volume %) of the first material S1 and the second material S2 is preferably 35 volume % or more and 97 volume % or less based on the total amount of the binder phase. In the cubic boron nitride sintered body, since the total content of the first material S1 and the second material S2 is 35 volume % or more, the toughness of the binder phase is improved, and the fracture resistance tends to be excellent. In the cubic boron nitride sintered body, since the total content is 97 volume % or less, the production tends to be eased. From a similar point of view, the total content of the first material S1 and the second material S2 is more preferably 45 volume % or more and 97 volume % or less, further preferably 50 volume % or more and 97 volume % or less, and still further preferably 74 volume % or more and 97 volume % or less.

The binder phase may contain another material in addition to the first material S1 and the second material S2, and the total content of the first material S1, the second material S2, and another material is 100 volume %. For example, if the total content of the first material S1 and the second material S2 is 35 volume %, remaining 65 volume % corresponds to another material. Such another material consists of one or two of metals or compounds containing neither W nor V.

Non-limiting specific examples of the first material S1 composed of a compound containing W include WC, $Co_3W_3C$, $W_2Co_{21}B_6$, CoWB, $W_2C$, and WB, and WC is preferred. Besides, when the ratio (S1/(S1+S2)) is increased, the toughness of the binder phase tends to be improved to obtain excellent fracture resistance, and therefore, the first material S1 composed of a compound containing W is preferably a material in which V is further dissolved as solid in any of the compounds described above as the specific examples of the first material S1. Non-limiting other examples of the first material S1 include VC, VN, V(C, N), and VB in which W is dissolved as solid, and VC, VN, and V(C, N) in which W is dissolved as solid are preferred.

Non-limiting specific examples of the second material S2 composed of a compound being free of W and containing V include VC, VN, V(C, N), and VB, and VC and VN are preferred.

Non-limiting specific examples of another material include Al, AlN, $AlB_2$, $Al_2O_3$, CrN, $Cr_2N$, $Cr_3C_2$, $Cr_7C_3$, $Cr_{23}C_6$, $Cr_2O_3$, $CrB_2$, TiN, TiC, Ti(C, N), $TiB_2$, Co, $Co_{5.47}N$, and CoN, and $Al_2O_3$, $Cr_2N$, $Cr_3C_2$, TiN, and Co are preferred.

In the cubic boron nitride sintered body according to the present embodiment, the respective contents (volume %) of the cubic boron nitride and the binder phase can be determined by analyzing, using commercially available image analysis software, a structural photograph of the cubic boron nitride sintered body taken by a scanning electron microscope (SEM). More specifically, the cubic boron nitride sintered body is mirror-polished in a direction orthogonal to a surface thereof. Next, using a SEM, an observation is conducted on a backscattered electron image of the mirror-polished surface of the cubic boron nitride sintered body exposed via the mirror polishing. At this time, the mirror-polished surface of the cubic boron nitride sintered body, magnified from 1,000 to 20,000 times using the SEM, is observed via a backscattered electron image. Using an energy-dispersive X-ray spectroscope (EDS) included with the SEM, it can be determined that a black region is identified as cubic boron nitride, and a gray region and a white region are each identified as a binder phase. Thereafter, a structural photograph of the above cross section of the cubic boron nitride is taken using a SEM. With commercially available image analysis software, the respective occupied areas of the cubic boron nitride and the binder phase are obtained from the obtained structural photograph, and the contents (volume %) are obtained from the occupied areas.

In the present embodiment, the content (mass %) of each of the elements in the binder phase can be determined using an energy-dispersive X-ray spectroscope (EDS) in the same observation field as that of a structural photograph of the cubic boron nitride sintered body taken with a scanning electron microscope (SEM) for obtaining the contents (volume %) of the cubic boron nitride and the binder phase. More specifically, EDS analysis is performed in the entire observation field of the magnified mirror-polished surface, and a content ratio (mass %) of each element is calculated assuming that the total content of all the elements contained in the cubic boron nitride sintered body is 100 mass %.

Herein, the mirror-polished surface of the cubic boron nitride sintered body is a cross section of the cubic boron nitride sintered body obtained by mirror-polishing the surface of the cubic boron nitride sintered body or an arbitrary cross-section thereof. Examples of a method for obtaining a mirror-polished surface of a cubic boron nitride sintered body include a polishing method using diamond paste.

The composition of a binder phase can be identified using a commercially available X-ray diffractometer. For example, when an X-ray diffraction measurement is performed, using an X-ray diffractometer (product name "RINT TTR III") manufactured by Rigaku Corporation, by means of a 2θ/θ focusing optical system with Cu-Kα radiation under the following conditions, the composition of the binder phase can be identified. Here, measurement conditions may be, for example, as follows.

<Exemplified Measurement Conditions>
Output: 50 kV, 250 mA
Incident-side Soller slit: 5°
Divergence vertical slit: ½°
Divergence vertical restriction slit: 10 mm
Scattering slit: ⅔°
Light-receiving side Soller slit: 5°
Light reception slit: 0.15 mm
BENT monochromator
Light-receiving monochrome slit: 0.8 mm Sampling width: 0.02°

Scan speed: 1°/min

2θ measurement range: 30° to 90°

In the present embodiment, the cubic boron nitride content and the binder phase content, and the binder phase composition can be determined by the methods described in the Examples mentioned below. Specifically, the composition of the binder phase can be specified by analyzing a measurement result obtained with an X-ray analyzer, and an element mapping result obtained using an EDS.

[Coated Cubic Boron Nitride Sintered Body]

The coated cubic boron nitride sintered body according to the present embodiment includes the cubic boron nitride sintered body mentioned above and a coating layer formed on a surface of the cubic boron nitride sintered body.

The coating layer formed on a surface of the cubic boron nitride sintered body further improves the wear resistance of the cubic boron nitride sintered body. The coating layer preferably includes an element of at least one element selected from the group consisting of Ti, Zr, Hf, V, Nb, Ta, Cr, Mo, W, Al, and Si and an element of at least one selected from the group consisting of C, N, O, and B. The coating layer may have a single-layer structure or a laminated structure including two or more layers. When the coating layer has such structures, the coated cubic boron nitride sintered body according to the present embodiment shows further improved wear resistance.

Non-limiting examples of compounds forming the coating layer include TiN, TiC, TiCN, TiAlN, TiSiN, AlCrN, and the like. Among these, TiCN, TiAlN, and AlCrN are preferred. The coating layer may have a structure in which multiple layers each having a different composition are laminated. In this case, an average thickness of each layer is, for example, preferably 0.3 μm or more and 4.5 μm or less.

The average thickness of the entire coating layer is preferably 0.5 μm or more and 5.0 μm or less. The coated cubic boron nitride sintered body of the present embodiment tends to show improved wear resistance when the average thickness of the entire coating layer is 0.5 μm or more. In contrast, the coated cubic boron nitride sintered body tends to suppress the occurrence of fractures due to peeling when the average thickness of the entire coating layer is 5.0 μm or less. From a similar point of view, the average thickness of the entire coating layer is more preferably 0.5 μm or more and 4.0 μm or less, and further preferably 1.0 μm or more and 3.0 μm or less.

The thickness of each layer that constitutes the coating layer and the thickness of the entire coating layer can be measured from a cross-sectional structure of the coated cubic boron nitride sintered body using an optical microscope, a SEM, a transmission electron microscope (TEM), or the like. It should be noted that, as to the average thickness of each layer and the average thickness of the entire coating layer in the coated cubic boron nitride sintered body, such average thicknesses can be obtained by measuring, near the position 50 μm from the edge of a surface facing the metal evaporation source toward the center of such surface, the thickness of each layer and the thickness of the entire coating layer from each of the cross sections at three or more locations, and calculating the average value thereof.

The composition of each layer that constitutes the coating layer can be measured from a cross-sectional structure of the coated cubic boron nitride sintered body using an EDS, a wavelength-dispersive X-ray spectroscope (WDS), or the like.

A method of manufacturing a coating layer in a coated cubic boron nitride sintered body according to the present embodiment is not particularly limited, and examples of such methods include chemical deposition methods and physical vapor deposition methods, such as an ion plating method, an arc ion plating method, a sputtering method, and an ion mixing method. Among them, arc ion plating methods are still preferred because further better adhesiveness between the coating layer and the cubic boron nitride sintered body can be provided.

The cubic boron nitride sintered body or the coated cubic boron nitride sintered body according to the present embodiment show excellent wear resistance and fracture resistance, and is therefore preferably used as cutting tools and wear-resistant tools, and among them, is preferably used as cutting tools. The cubic boron nitride sintered body or the coated cubic boron nitride sintered body according to the present embodiment is further preferably used as cutting tools for sintered metals or cast iron. The tool life can be extended compared to conventional tools when the cubic boron nitride sintered body or the coated cubic boron nitride sintered body according to the present embodiment is used as cutting tools or wear-resistant tools.

The cubic boron nitride sintered body according to the present embodiment is manufactured, for example, in the following manner.

As raw material powder, cBN powder, Al powder, WC powder, VC powder, VN powder, $Cr_2N$ powder, $Cr_3C_2$ powder, TiN powder, and Co powder are prepared. Here, the average particle size of the cBN in an obtained cubic boron nitride sintered body can be controlled within the above specific range by appropriately adjusting the average particle size of the raw material cBN powder. In addition, the contents of the cBN and the binder phase in an obtained cubic boron nitride sintered body can be controlled within the above specific ranges by appropriately adjusting the proportion of each raw material powder. Next, the prepared raw material powder is put in a ball mill cylinder together with cemented carbide balls, a solvent, and paraffin, and then mixed. The raw material powder mixed with a ball mill is filled in a high-melting-point metal capsule made of Ta, and subjected to a vacuum heat treatment with the capsule left opened for removing moisture adsorbed onto the surface of the powder and another adhering component.

Next, the capsule is sealed, and the raw material powder filled in the capsule is sintered at a high pressure. In filling the raw material powder in the capsule, a substrate of cemented carbide is preferably put on the bottom thereof. Thus, a cubic boron nitride sintered body having a substrate of cemented carbide can be produced, and abrasion resistance and/or fracture resistance of a tool tends to be further improved. For example, the conditions of the high-pressure sintering are a pressure of 7.0 to 8.0 GPa, a temperature of 1900 to 2050° C., and a sintering time of 30 to 50 minutes.

In the binder phase used in the present embodiment, non-limiting examples of a method for setting high the ratio of the content (volume %) of the first material S1 composed of a compound containing W to the total content (volume %) of the first material S1 and the second material S2 composed of a compound being free of W and containing V, (S1/(S1+S2)), include a method in which a substrate of cemented carbide is put in a capsule to be filled with a raw material powder in the production process of the cubic boron nitride sintered body, a method in which the sintering temperature is increased, a method in which the content ratio of the cBN is reduced, a method in which the average particle size of the cBN is increased, a method in which the Al content is increased, and a method in which the Cr content is reduced if Cr is contained.

Non-limiting examples of a method for increasing the total content (volume %) of the first material Si and the second material S2 include a method in which a capsule holding a substrate of cemented carbide is used as a capsule to be filled with the raw material powder in the production process of the cubic boron nitride sintered body, a method in which the sintering temperature is increased, a method in which the content ratio of the cBN is reduced, a method in which the average particle size of the cBN is increased, a method in which the W content is increased, and a method in which the Cr content is reduced if Cr is contained.

Besides, when the cubic boron nitride sintered body of the present embodiment is processed into a desired shape with a wire electric discharge machine or a laser cutting machine, a cutting tool or a wear resistant tool containing the cubic boron nitride sintered body can be produced.

EXAMPLES

Although the present invention will be described in further detail below with examples, the present invention is not limited to such examples.

Example 1

Preparation of Raw Material Powder

A cubic boron nitride power, an Al powder, a WC powder, a VC powder, a VN powder, a $Cr_2N$ powder, a $Cr_3C_2$ powder, a TiN powder, and a Co powder were mixed in the proportion listed in the following Table 1. The average particle sizes of the cBN powder, the VC powder, and the VN powder were as listed in Table 1. The average particle sizes of the Al powder, the WC powder, the $Cr_2N$ powder, the $Cr_3C_2$ powder, the TiN powder, and the Co powder were respectively 1.8 μm, 2.0 μm, 6.0 μm, 6.0 μm, 1.5 μm, and 1.5 μm. The average particle size of each raw material powder was measured in accordance with the Fisher process (Fisher Sub-Sieve Sizer (FSSS)) disclosed in the American Society for Testing Materials (ASTM) standard B330. It is noted that "-" used in Table 1 denotes that the corresponding raw material is not contained and hence no value is listed.

TABLE 1

| | Mixing Composition (mass %) | | | | | | | | | Average Particle Size (mm) of Raw Material Powder | | |
|---|---|---|---|---|---|---|---|---|---|---|---|---|
| Sample Number | cBN | Al | WC | VC | VN | $Cr_2N$ | $Cr_3C_2$ | TIN | Co | CBA | VC | VN |
| Invention Sample 1 | 74.7 | 1.3 | 7.0 | 7.0 | 0.0 | 3.0 | 0.0 | 0.0 | 7.0 | 1.0 | 2.2 | — |
| Invention Sample 2 | 74.7 | 1.3 | 7.0 | 0.0 | 7.0 | 3.0 | 0.0 | 0.0 | 7.0 | 1.0 | — | 4.5 |
| Invention Sample 3 | 87.5 | 1.5 | 0.0 | 0.0 | 8.0 | 3.0 | 0.0 | 0.0 | 0.0 | 1.0 | — | 4.5 |
| Invention Sample 4 | 87.5 | 1.5 | 0.0 | 8.0 | 0.0 | 3.0 | 0.0 | 0.0 | 0.0 | 1.0 | 2.2 | — |
| Invention Sample 5 | 87.5 | 1.5 | 0.0 | 8.0 | 0.0 | 3.0 | 0.0 | 0.0 | 0.0 | 1.0 | 0.5 | — |
| Invention Sample 6 | 69.0 | 3.8 | 7.1 | 7.5 | 0.0 | 4.2 | 0.0 | 0.0 | 8.4 | 1.0 | 2.2 | — |
| Invention Sample 7 | 90.0 | 1.0 | 3.0 | 3.0 | 0.0 | 0.5 | 0.0 | 0.0 | 2.5 | 1.0 | 2.2 | — |
| Invention Sample 8 | 73.2 | 0.5 | 7.5 | 7.5 | 0.0 | 2.9 | 0.0 | 0.0 | 8.4 | 1.8 | 2.2 | — |
| Invention Sample 9 | 80.0 | 5.0 | 4.3 | 4.3 | 0.0 | 1.6 | 0.0 | 0.0 | 4.8 | 1.8 | 2.2 | — |
| Invention Sample 10 | 76.5 | 1.3 | 2.2 | 7.6 | 0.0 | 2.9 | 0.0 | 0.0 | 9.5 | 1.0 | 2.2 | — |
| Invention Sample 11 | 73.0 | 1.0 | 10.7 | 5.8 | 0.0 | 2.2 | 0.0 | 0.0 | 7.3 | 1.0 | 2.2 | — |
| Invention Sample 12 | 75.0 | 3.5 | 9.5 | 2.5 | 0.0 | 0.0 | 0.0 | 0.0 | 9.5 | 1.0 | 2.2 | — |
| Invention Sample 13 | 77.0 | 1.5 | 4.0 | 10.0 | 0.0 | 3.5 | 0.0 | 0.0 | 4.0 | 1.0 | 2.2 | — |
| Invention Sample 14 | 76.0 | 2.0 | 6.5 | 7.5 | 0.0 | 0.0 | 0.0 | 0.0 | 8.0 | 1.0 | 2.2 | — |
| Invention Sample 15 | 76.0 | 1.5 | 5.0 | 5.8 | 0.0 | 5.6 | 0.0 | 0.0 | 6.1 | 1.0 | 2.2 | — |
| Invention Sample 16 | 74.7 | 1.3 | 7.0 | 7.0 | 0.0 | 3.0 | 0.0 | 0.0 | 7.0 | 0.3 | 2.2 | — |
| Invention Sample 17 | 74.7 | 1.3 | 7.0 | 7.0 | 0.0 | 3.0 | 0.0 | 0.0 | 7.0 | 0.5 | 2.2 | — |
| Invention Sample 18 | 74.7 | 1.3 | 7.0 | 7.0 | 0.0 | 3.0 | 0.0 | 0.0 | 7.0 | 3.0 | 2.2 | — |
| Invention Sample 19 | 74.7 | 1.3 | 7.0 | 7.0 | 0.0 | 3.0 | 0.0 | 0.0 | 7.0 | 5.0 | 2.2 | — |
| Invention Sample 20 | 74.7 | 1.3 | 7.0 | 7.0 | 0.0 | 0.0 | 3.0 | 0.0 | 7.0 | 1.0 | 2.2 | — |
| Invention Sample 21 | 74.9 | 1.3 | 7.0 | 7.0 | 0.0 | 1.0 | 0.0 | 1.8 | 7.0 | 1.0 | 2.2 | — |
| Comparative Sample 1 | 81.0 | 2.2 | 0.0 | 11.8 | 0.0 | 5.0 | 0.0 | 0.0 | 0.0 | 1.0 | 2.2 | — |
| Comparative Sample 2 | 67.0 | 3.0 | 8.0 | 9.0 | 0.0 | 2.0 | 0.0 | 0.0 | 11.0 | 1.0 | 2.2 | — |
| Comparative Sample 3 | 63.0 | 4.5 | 8.5 | 9.0 | 0.0 | 5.0 | 0.0 | 0.0 | 10.0 | 1.0 | 2.2 | — |
| Comparative Sample 4 | 93.5 | 0.8 | 2.4 | 2.6 | 0.0 | 0.1 | 0.0 | 0.0 | 0.6 | 1.0 | 2.2 | — |
| Comparative Sample 5 | 73.5 | 0.0 | 7.5 | 7.5 | 0.0 | 3.0 | 0.0 | 0.0 | 8.5 | 1.8 | 2.2 | — |
| Comparative Sample 6 | 83.0 | 7.0 | 2.8 | 2.9 | 0.0 | 1.1 | 0.0 | 0.0 | 3.2 | 1.8 | 2.2 | — |
| Comparative Sample 7 | 76.5 | 1.4 | 1.1 | 8.0 | 0.0 | 3.0 | 0.0 | 0.0 | 10.0 | 1.0 | 2.2 | — |
| Comparative Sample 8 | 72.0 | 1.0 | 12.8 | 5.4 | 0.0 | 2.0 | 0.0 | 0.0 | 6.8 | 1.0 | 2.2 | — |
| Comparative Sample 9 | 75.0 | 3.7 | 10.0 | 1.3 | 0.0 | 0.0 | 0.0 | 0.0 | 10.0 | 1.0 | 2.2 | — |
| Comparative Sample 10 | 78.0 | 0.7 | 2.2 | 12.5 | 0.0 | 5.6 | 0.0 | 0.0 | 1.0 | 1.0 | 2.2 | — |
| Comparative Sample 11 | 76.0 | 1.2 | 4.1 | 4.7 | 0.0 | 9.0 | 0.0 | 0.0 | 5.0 | 1.0 | 2.2 | — |
| Comparative Sample 12 | 74.7 | 1.3 | 7.0 | 0.0 | 0.0 | 3.0 | 0.0 | 7.0 | 7.0 | 1.0 | — | — |

[Mixing Process]

The raw material powder, hexane solvent, and paraffin were put in a ball mill cylinder together with a cemented carbide ball to be further mixed.

[Filling Process and Drying Process]

The mixed raw material powder was filled in a disc-shaped high-melting-point metal capsule made of Ta. In filling the raw material powder, a capsule holding a cemented carbide substrate on the bottom was used for invention samples 3 to 5 and comparative sample 1, and a capsule not holding a cemented carbide substrate was used for the other samples. The cemented carbide substrate used had a composition of 93.5 WC-6.0 Co-0.5 $Cr_3C_2$ (all in mass %). Next, with the capsule left opened, a vacuum heat treatment was performed to remove moisture adsorbed onto the surface of the powder and another adhering component, and the capsule was then sealed.

[High-pressure Sintering]

Thereafter, the raw material powder filled in the capsule was sintered at a high pressure. The following Table 2 shows the conditions for the high-pressure sintering.

TABLE 2

| | Filling Process | Sintering Conditions | | |
|---|---|---|---|---|
| Sample Number | Substrate of Cemented Carbide | Temperature (° C.) | Pressure (GPa) | Time (min) |
| Invention Sample 1 | not used | 1950 | 8 | 40 |
| Invention Sample 2 | not used | 1950 | 8 | 40 |
| Invention Sample 3 | used | 1900 | 7 | 30 |
| Invention Sample 4 | used | 1900 | 7 | 30 |
| Invention Sample 5 | used | 1900 | 7 | 30 |
| Invention Sample 6 | not used | 1900 | 7 | 40 |
| Invention Sample 7 | not used | 2000 | 8 | 40 |
| Invention Sample 8 | not used | 2000 | 8 | 40 |
| Invention Sample 9 | not used | 1950 | 8 | 40 |
| Invention Sample 10 | not used | 1950 | 8 | 40 |
| Invention Sample 11 | not used | 1950 | 8 | 40 |
| Invention Sample 12 | not used | 1950 | 8 | 40 |
| Invention Sample 13 | not used | 1950 | 8 | 40 |
| Invention Sample 14 | not used | 1950 | 8 | 40 |
| Invention Sample 15 | not used | 1950 | 8 | 40 |
| Invention Sample 16 | not used | 2050 | 8 | 50 |
| Invention Sample 17 | not used | 2050 | 8 | 50 |
| Invention Sample 18 | not used | 1900 | 7 | 40 |
| Invention Sample 19 | not used | 1900 | 7 | 40 |
| Invention Sample 20 | not used | 1950 | 8 | 40 |
| Invention Sample 21 | not used | 1950 | 8 | 40 |
| Comparative Sample 1 | used | 1750 | 7 | 30 |
| Comparative Sample 2 | not used | 1800 | 8 | 40 |
| Comparative Sample 3 | not used | 1900 | 7 | 40 |
| Comparative Sample 4 | not used | 2050 | 8 | 50 |
| Comparative Sample 5 | not used | 2050 | 8 | 50 |
| Comparative Sample 6 | not used | 1850 | 8 | 40 |
| Comparative Sample 7 | not used | 1850 | 8 | 40 |
| Comparative Sample 8 | not used | 1950 | 8 | 40 |
| Comparative Sample 9 | not used | 1950 | 8 | 40 |
| Comparative Sample 10 | not used | 1950 | 8 | 40 |
| Comparative Sample 11 | not used | 1950 | 8 | 40 |
| Comparative Sample 12 | not used | 1950 | 8 | 40 |

[Measurement/Analysis]

The contents (volume %) of the cubic boron nitride and the binder phase in the cubic boron nitride sintered body obtained by high-pressure sintering was determined by analyzing a structural photograph of the cubic boron nitride sintered body, which had been taken by a scanning electron microscope (SEM), using commercially available image analysis software. More specifically, the cubic boron nitride sintered body was mirror-polished in a direction orthogonal to a surface thereof. Next, a backscattered electron image of the mirror-polished surface of the cubic boron nitride sintered body exposed via the mirror polishing was observed using a SEM. At this time, the mirror-polished surface of the cubic boron nitride sintered body was observed using the SEM via a backscattered electron image at a magnification such that 100 or more and 400 or less cubic boron nitride particles could be covered. Using an energy-dispersive X-ray spectroscope (EDS) included with the SEM, a black region was identified as cubic boron nitride, and gray and white regions were identified as binder phases. Thereafter, a structural photograph of the mirror-polished surface of the cubic boron nitride was taken using the SEM. With commercially available image analysis software, the respective occupied areas of the cubic boron nitride and the binder phase were determined from the obtained structural photograph, and the contents (volume %) were determined from the occupied areas.

Here, a cross section of the cubic boron nitride sintered body obtained by mirror-polishing the surface of the cubic boron nitride sintered body or an arbitrary cross-section thereof was set as the mirror-polished surface of the cubic boron nitride sintered body. Polishing using diamond paste was adopted as the method for obtaining a mirror-polished surface of a cubic boron nitride sintered body (hereinafter also referred to as the "cross section").

The composition of the binder phase was identified using an X-ray diffractometer (product name "RINT TTR III") manufactured by Rigaku Corporation. Specifically, a result of X-ray diffraction measurement of a 2θ/θ focusing optical system performed using Cu-Kα ray under the following conditions and an element mapping result using an EDS were analyzed to identify the composition of the binder phase.

<Measurement Conditions>

Output: 50 kV, 250 mA

Incident-side Soller slit: 5°

Divergence vertical slit: ½°

Divergence vertical restriction slit: 10 mm

Scattering slit: ⅔°

Light-receiving side Soller slit: 5°

Light reception slit: 0.15 mm

BENT monochromator

Light-receiving monochrome slit: 0.8 mm

Sampling width: 0.02°

Scan speed: 1°/min

2θ measurement range: 30° to 90°

Specifically, it was specified, through the X-ray diffraction measurement performed by the above-described method, that the obtained cubic boron nitride sintered body contained the following materials:

$Co_3W_3C$, $W_2Co_{21}B_6$, and $Co_{5.47}N$;

WC (excluding invention samples 3, 4, and 5, and comparative sample 1);

VC (excluding comparative sample 12);

VN (invention samples 2 and 3); and

TiN and $TiB_2$ (invention sample 21 and comparative sample 12).

As to the compound containing W element and/or V element, it was specified or presumed, through the element mapping using the EDS, that the obtained cubic boron nitride sintered body further contained the following materials:

materials in which compounds presumed as $Co_3W_3C$ and $W_2Co_{21}B_6$ further contain V element (excluding comparative sample 12);

material in which a compound presumed as WC further contains V element (excluding invention samples 3, 4, and 5, and comparative samples 1 and 12);

material in which a compound presumed as VC further contains W element (excluding comparative sample 12); and material in which a compound presumed as VN further contains W element (invention samples 2 and 3).

In addition, as to the compound containing Al element and the compound containing Cr element, no clear peak was obtained in the X-ray diffraction measurement, and hence the identification was performed through the element mapping using an EDS. As a result, it was specified or presumed that the obtained cubic boron nitride sintered body further contained the following materials:

AlN, $AlB_2$, and $Al_2O_3$ (excluding comparative sample 5);

material containing Cr carbide presumed as $Cr_3C_2$, $Cr_7C_3$, and $Cr_{23}C_6$, the Cr carbide further containing Co element (excluding invention samples 12 and 14, and comparative sample 9);

material containing Cr nitride presumed as CrN and $Cr_2N$, the Cr nitride further containing Co element (excluding invention samples 12, 14, and 20, and comparative sample 9); and material presumed as Cr carbonitride in which the Cr carbide and the Cr nitride described above were mutually dissolved as solid (excluding invention samples 12, 14, and 20, and comparative sample 9).

In the observation field in which the structural photograph used for determining the content ratios of the cBN and the binder phase, the element mapping using an EDS was performed to confirm distributions of W and V. The resultant map image was subjected to image analysis to calculate areas occupied by the first material S1 composed of a compound containing W, and by the second material S2 composed of a compound being free of W and containing V, and thus, the content ratios (volume %) of the materials S1 and S2 based on 100 volume % of the entire content of the binder phase were calculated. The ratio of the content of the material S1 to the total content of the materials S1 and S2 (S1/(S1+S2)), and the total content of the materials S1 and S2 are listed in the following Table 3.

Through the image analysis of the structural photograph of the cubic boron nitride sintered body taken with the SEM, the area of a cBN particle was obtained, and the diameter of a circle with an area equal to the thus obtained area was determined as the particle size of the cBN. Subsequently, a value satisfying the relationship of the following expression was calculated as $D_{50}$, and the obtained value $D_{50}$ was determined as the average particle size of the cBN in the cubic boron nitride sintered body.

(Area occupied by cBN particles having particle size of $D_{50}$ or less)/(Area occupied by all the cBN particles)=0.5

In addition, as described above, the cross section was observed with the SEM to determine the composition of each element in the binder phase using an EDS included in the SEM.

The content (mass %) of each element in the binder phase was determined, using the EDS, in the same observation field as that of the structural photograph of the cubic boron nitride sintered body taken with the SEM for obtaining the contents (volume %) of the cubic boron nitride and the binder phase. Specifically, EDS analysis was performed in the entire observation field of the magnified mirror-polished surface, and the content ratio (mass %) of each element assuming that the total content of all the elements contained in the cubic boron nitride sintered body was 100 mass % was calculated.

These measurement results are all listed in the following Table 4.

TABLE 3

| | Cubic Boron Nitride Sintered Body Binder Phase | |
|---|---|---|
| Sample Number | S1/(S1 + S2) (volume ratio) | S1 + S2 (volume %) |
| Invention Sample 1 | 0.47 | 47 |
| Invention Sample 2 | 0.36 | 50 |
| Invention Sample 3 | 0.76 | 52 |
| Invention Sample 4 | 0.87 | 74 |
| Invention Sample 5 | 0.95 | 97 |
| Invention Sample 6 | 0.51 | 51 |
| Invention Sample 7 | 0.42 | 42 |
| Invention Sample 8 | 0.45 | 41 |
| Invention Sample 9 | 0.50 | 40 |
| Invention Sample 10 | 0.41 | 32 |
| Invention Sample 11 | 0.44 | 62 |
| Invention Sample 12 | 0.37 | 51 |
| Invention Sample 13 | 0.48 | 51 |
| Invention Sample 14 | 0.51 | 50 |
| Invention Sample 15 | 0.43 | 40 |
| Invention Sample 16 | 0.34 | 39 |
| Invention Sample 17 | 0.40 | 45 |
| Invention Sample 18 | 0.52 | 48 |
| Invention Sample 19 | 0.56 | 51 |
| Invention Sample 20 | 0.46 | 45 |
| Invention Sample 21 | 0.44 | 42 |
| Comparative Sample 1 | 0.31 | 43 |
| Comparative Sample 2 | 0.25 | 29 |
| Comparative Sample 3 | 0.55 | 58 |
| Comparative Sample 4 | 0.32 | 31 |
| Comparative Sample 5 | 0.34 | 32 |
| Comparative Sample 6 | 0.52 | 32 |

TABLE 3-continued

| Sample Number | Cubic Boron Nitride Sintered Body Binder Phase S1/(S1 + S2) (volume ratio) | S1 + S2 (volume %) |
|---|---|---|
| Comparative Sample 7 | 0.33 | 17 |
| Comparative Sample 8 | 0.34 | 74 |
| Comparative Sample 9 | 0.25 | 54 |
| Comparative Sample 10 | 0.45 | 39 |
| Comparative Sample 11 | 0.30 | 30 |
| Comparative Sample 12 | 1.00 | 34 |

TABLE 4

| | Cubic Boron Nitride Sintered Body | | | | | | | | |
|---|---|---|---|---|---|---|---|---|---|
| | cBN | | Binder Phase | | | | | | |
| | | Average Particle | | Composition (mass %) | | | | | |
| Sample Number | (volume %) | Size (μm) | (volume %) | Al | W | V | Cr | Ti | Co |
| Invention Sample 1 | 86 | 1.0 | 14 | 1.3 | 6.5 | 5.7 | 2.7 | 0.0 | 7.0 |
| Invention Sample 2 | 86 | 1.0 | 14 | 1.3 | 6.6 | 5.6 | 2.7 | 0.0 | 7.0 |
| Invention Sample 3 | 86 | 1.0 | 14 | 1.3 | 6.8 | 5.7 | 2.8 | 0.0 | 6.9 |
| Invention Sample 4 | 86 | 1.0 | 14 | 1.3 | 6.7 | 5.7 | 2.9 | 0.0 | 7.1 |
| Invention Sample 5 | 86 | 1.0 | 14 | 1.3 | 6.8 | 5.6 | 2.9 | 0.0 | 7.1 |
| Invention Sample 6 | 81 | 1.0 | 19 | 3.7 | 6.7 | 6.1 | 3.7 | 0.0 | 8.4 |
| Invention Sample 7 | 95 | 1.0 | 5 | 0.9 | 2.8 | 2.4 | 0.4 | 0.0 | 2.7 |
| Invention Sample 8 | 86 | 1.8 | 14 | 0.5 | 7.0 | 6.0 | 2.6 | 0.0 | 8.5 |
| Invention Sample 9 | 86 | 1.8 | 14 | 5.0 | 4.0 | 3.4 | 1.5 | 0.0 | 4.8 |
| Invention Sample 10 | 86 | 1.0 | 14 | 1.3 | 2.0 | 6.2 | 2.5 | 0.0 | 9.3 |
| Invention Sample 11 | 86 | 1.0 | 14 | 1.0 | 10.0 | 4.7 | 1.9 | 0.0 | 7.4 |
| Invention Sample 12 | 86 | 1.0 | 14 | 3.5 | 8.9 | 2.0 | 0.0 | 0.0 | 9.4 |
| Invention Sample 13 | 86 | 1.0 | 14 | 1.4 | 3.8 | 8.0 | 3.0 | 0.0 | 4.2 |
| Invention Sample 14 | 86 | 1.0 | 14 | 2.0 | 6.1 | 6.0 | 0.0 | 0.0 | 7.9 |
| Invention Sample 15 | 86 | 1.0 | 14 | 1.5 | 4.7 | 4.6 | 5.0 | 0.0 | 5.9 |
| Invention Sample 16 | 86 | 0.3 | 14 | 1.3 | 6.4 | 5.7 | 2.7 | 0.0 | 7.0 |
| Invention Sample 17 | 86 | 0.5 | 14 | 1.3 | 6.5 | 5.7 | 2.6 | 0.0 | 6.9 |
| Invention Sample 18 | 86 | 3.0 | 14 | 1.4 | 6.6 | 5.7 | 2.7 | 0.0 | 7.1 |
| Invention Sample 19 | 86 | 5.0 | 14 | 1.3 | 6.5 | 5.7 | 2.7 | 0.0 | 7.2 |
| Invention Sample 20 | 86 | 1.0 | 14 | 1.3 | 6.5 | 5.7 | 2.7 | 0.0 | 6.9 |
| Invention Sample 21 | 86 | 1.0 | 14 | 1.2 | 6.4 | 5.8 | 0.9 | 1.4 | 7.0 |
| Comparative Sample 1 | 79 | 1.0 | 21 | 1.8 | 9.9 | 7.6 | 4.1 | 0.0 | 11.0 |
| Comparative Sample 2 | 79 | 1.0 | 21 | 2.9 | 7.5 | 7.3 | 1.8 | 0.0 | 10.9 |
| Comparative Sample 3 | 76 | 1.0 | 24 | 4.5 | 8.6 | 7.8 | 4.7 | 0.0 | 10.1 |
| Comparative Sample 4 | 97 | 1.0 | 3 | 0.8 | 2.3 | 2.1 | 0.1 | 0.0 | 0.8 |
| Comparative Sample 5 | 86 | 1.8 | 14 | 0.0 | 7.0 | 6.1 | 2.7 | 0.0 | 8.6 |
| Comparative Sample 6 | 86 | 1.8 | 14 | 7.0 | 2.7 | 2.3 | 1.0 | 0.0 | 3.2 |
| Comparative Sample 7 | 86 | 1.0 | 14 | 1.3 | 1.0 | 6.5 | 2.6 | 0.0 | 9.9 |
| Comparative Sample 8 | 86 | 1.0 | 14 | 0.9 | 12.0 | 4.4 | 1.8 | 0.0 | 6.7 |
| Comparative Sample 9 | 86 | 1.0 | 14 | 3.6 | 9.4 | 1.0 | 0.0 | 0.0 | 10.2 |
| Comparative Sample 10 | 86 | 1.0 | 14 | 0.7 | 2.1 | 10.0 | 5.0 | 0.0 | 1.0 |
| Comparative Sample 11 | 86 | 1.0 | 14 | 1.2 | 3.8 | 3.8 | 8.0 | 0.0 | 4.9 |
| Comparative Sample 12 | 86 | 1.0 | 14 | 1.2 | 6.6 | 0.0 | 2.6 | 5.8 | 7.0 |

Preparation of Cutting Tool

The obtained cubic boron nitride sintered body was cut out so as to correspond to the insert-shaped tool shape defined in the ISO standard CNGA 120408 using a wire electric discharge machine. The cut-out cubic boron nitride sintered body was joined to a cemented carbide base metal via brazing. At this time, the cubic boron nitride sintered body obtained was brazed to the base metal together with the substrate of cemented carbide in invention samples 3 to 5 and comparative sample 1. The brazed tool was honing-processed to obtain a cutting tool.

Cutting Test

By using the obtained cutting tools, a cutting test was performed under the following conditions.

Work material: SMF 5040 carburized and hardened metal (HRA 70)

Work material shape: Gear shape, ϕ 45 mm (tooth depth: 8 mm)×30 mm

Cutting speed: 150 m/min,

Feed: 0.1 mm/rev,

Depth of cut: 0.2 mm,

Coolant: not used (dry cutting)

Evaluation items: The tool life was defined as when the width of the flank wear had reached 0.15 mm, or when the cutting tool had been fractured, and the processing time to the tool life was measured. Besides, damage form obtained when the tool life reached was observed with a SEM. The damage form of "Chipped" means that slight chipping was caused but the width of the flank wear reached 0.15 mm before the cutting tool was fractured. Measurement results are shown in the following Table 5.

TABLE 5

| | Cutting Performance | |
|---|---|---|
| Sample Number | Tool Life (min) | Damage Form |
| Invention Sample 1 | 36 | Normal Wear |
| Invention Sample 2 | 35 | Normal Wear |
| Invention Sample 3 | 44 | Normal Wear |
| Invention Sample 4 | 45 | Normal Wear |
| Invention Sample 5 | 48 | Normal Wear |
| Invention Sample 6 | 30 | Normal Wear |
| Invention Sample 7 | 34 | Normal Wear |
| Invention Sample 8 | 35 | Normal Wear |
| Invention Sample 9 | 33 | Normal Wear |
| Invention Sample 10 | 32 | Normal Wear |

TABLE 5-continued

| Sample Number | Cutting Performance | |
|---|---|---|
| | Tool Life (min) | Damage Form |
| Invention Sample 11 | 34 | Normal Wear |
| Invention Sample 12 | 35 | Normal Wear |
| Invention Sample 13 | 41 | Normal Wear |
| Invention Sample 14 | 37 | Normal Wear |
| Invention Sample 15 | 37 | Normal Wear |
| Invention Sample 16 | 31 | Normal Wear |
| Invention Sample 17 | 33 | Normal Wear |
| Invention Sample 18 | 32 | Normal Wear |
| Invention Sample 19 | 30 | Normal Wear |
| Invention Sample 20 | 40 | Normal Wear |
| Invention Sample 21 | 33 | Normal Wear |
| Comparative Sample 1 | 27 | Normal Wear |
| Comparative Sample 2 | 26 | Normal Wear |
| Comparative Sample 3 | 23 | Normal Wear |
| Comparative Sample 4 | 2 | Fractured |
| Comparative Sample 5 | 4 | Fractured |
| Comparative Sample 6 | 22 | Normal Wear |
| Comparative Sample 7 | 14 | Fractured |
| Comparative Sample 8 | 21 | Normal Wear |
| Comparative Sample 9 | 25 | Normal Wear |
| Comparative Sample 10 | 10 | Fractured |
| Comparative Sample 11 | 16 | Chipped |
| Comparative Sample 12 | 14 | Chipped |

Based on the results shown in Table 5, the following was found: The invention samples, in each of which the cubic boron nitride sintered body contains the cubic boron nitride and the binder phase, the content of the cubic boron nitride is 81 volume % or more and 95 volume % or less based on the total amount of the sintered body, the content of the binder phase is 5 volume % or more and 19 volume % or less based on the total amount of the sintered body, the content of Al in the binder phase is 0.5 mass % or more and 5 mass % or less based on 100 mass % in total of all the elements contained in the sintered body, the content of W in the binder phase is 2 mass % or more and 10 mass % or less based on 100 mass % in total of all the elements contained in the sintered body, the content of V in the binder phase is 2 mass % or more and 8 mass % or less based on 100 mass % in total of all the elements contained in the sintered body, and the content of Cr in the binder phase is 0 mass % or more and 5 mass % or less based on 100 mass % in total of all the elements contained in the sintered body, are excellent in cutting performance and have extended tool life as compared with the comparative samples not having these features.

Example 2

Next, as indicated in Table 6, ion bombardment processing was applied to the surfaces of the cubic boron nitride sintered bodies of invention samples 1, 4, 6, and 7 obtained in Example 1, and coating layers were formed by an arc ion plating method. When a first layer and a second layer were formed, these layers were formed on the surface of the cubic boron nitride sintered body in the stated order. The processing conditions were as described below. The compositions and average thicknesses of the coating layers were as listed in the following Table 6. It is noted that "-" used in Table 6 denotes that the corresponding layer was not formed.

Condition of Ion Bombardment Processing

Substrate temperature: 500° C.

Pressure: Ar gas atmosphere at 2.7 Pa

Voltage: −400 V

Current: 40 A

Time: 30 min

Coating Layer Formation Condition

Substrate temperature: 500° C.

Pressure: nitrogen ($N_2$) gas atmosphere at 3.0 Pa (for nitride layer), or a mixed gas atmosphere of nitrogen ($N_2$) gas and acetylene ($C_2H_2$) gas at 3.0 Pa (for carbonitride layer)

Voltage: −60 V

Current: 120 A

TABLE 6

| Sample Number | cBN sintered body | Coating Layer | | | | |
|---|---|---|---|---|---|---|
| | | First Layer | | Second Layer | | Average |
| | | Composition | Average Thickness (μm) | Composition | Average Thickness (μm) | Thickness (mm) of Entire Coating Layer |
| Invention Sample 22 | Invention Sample 1 | $(Al_{0.5}Cr_{0.5})N$ | 0.5 | — | — | 0.5 |
| Invention Sample 23 | Invention Sample 1 | $(Ti_{0.5}Al_{0.5})N$ | 0.5 | — | — | 0.5 |
| Invention Sample 24 | Invention Sample 1 | $(Ti_{0.5}Al_{0.5})N$ | 0.3 | TiCN | 0.7 | 1.0 |
| Invention Sample 25 | Invention Sample 1 | $(Al_{0.5}Cr_{0.5})N$ | 0.3 | $(Ti_{0.5}Al_{0.5})N$ | 0.7 | 1.0 |
| Invention Sample 26 | Invention Sample 1 | $(Al_{0.5}Cr_{0.5})N$ | 5.0 | — | — | 5.0 |
| Invention Sample 27 | Invention Sample 1 | $(Ti_{0.5}Al_{0.5})N$ | 5.0 | — | — | 5.0 |
| Invention Sample 28 | Invention Sample 1 | $(Ti_{0.5}Al_{0.5})N$ | 0.5 | TiCN | 4.5 | 5.0 |
| Invention Sample 29 | Invention Sample 1 | $(Al_{0.5}Cr_{0.5})N$ | 0.5 | $(Ti_{0.5}Al_{0.5})N$ | 4.5 | 5.0 |
| Invention Sample 30 | Invention Sample 4 | $(Al_{0.5}Cr_{0.5})N$ | 3.0 | — | — | 3.0 |
| Invention Sample 31 | Invention Sample 4 | $(Ti_{0.5}Al_{0.5})N$ | 3.0 | — | — | 3.0 |
| Invention Sample 32 | Invention Sample 4 | $(Ti_{0.5}Al_{0.5})N$ | 0.5 | TiCN | 2.5 | 3.0 |
| Invention Sample 33 | Invention Sample 4 | $(Al_{0.5}Cr_{0.5})N$ | 0.5 | $(Ti_{0.5}Al_{0.5})N$ | 2.5 | 3.0 |

TABLE 6-continued

| Sample Number | cBN sintered body | Coating Layer | | | | |
|---|---|---|---|---|---|---|
| | | First Layer | | Second Layer | | Average |
| | | Composition | Average Thickness (μm) | Composition | Average Thickness (μm) | Thickness (mm) of Entire Coating Layer |
| Invention Sample 34 | Invention Sample 6 | $(Al_{0.5}Cr_{0.5})N$ | 3.0 | — | — | 3.0 |
| Invention Sample 35 | Invention Sample 6 | $(Ti_{0.5}Al_{0.5})N$ | 3.0 | — | — | 3.0 |
| Invention Sample 36 | Invention Sample 6 | $(Ti_{0.5}Al_{0.5})N$ | 0.5 | TiCN | 2.5 | 3.0 |
| Invention Sample 37 | Invention Sample 6 | $(Al_{0.5}Cr_{0.5})N$ | 0.5 | $(Ti_{0.5}Al_{0.5})N$ | 2.5 | 3.0 |
| Invention Sample 38 | Invention Sample 7 | $(Al_{0.5}Cr_{0.5})N$ | 3.0 | — | — | 3.0 |
| Invention Sample 39 | Invention Sample 7 | $(Ti_{0.5}Al_{0.5})N$ | 3.0 | — | — | 3.0 |
| Invention Sample 40 | Invention Sample 7 | $(Ti_{0.5}Al_{0.5})N$ | 0.5 | TiCN | 2.5 | 3.0 |
| Invention Sample 41 | Invention Sample 7 | $(Al_{0.5}Cr_{0.5})N$ | 0.5 | $(Ti_{0.5}Al_{0.5})N$ | 2.5 | 3.0 |

A cutting test of a coated cubic boron nitride sintered body provided with a coating layer on the surface was performed similarly to Example 1. Table 7 shows the results.

TABLE 7

| Sample Number | Cutting Performance | |
|---|---|---|
| | Tool Life (min) | Damage Form |
| Invention Sample 22 | 38 | Normal Wear |
| Invention Sample 23 | 38 | Normal Wear |
| Invention Sample 24 | 41 | Normal Wear |
| Invention Sample 25 | 40 | Normal Wear |
| Invention Sample 26 | 43 | Normal Wear |
| Invention Sample 27 | 41 | Normal Wear |
| Invention Sample 28 | 42 | Normal Wear |
| Invention Sample 29 | 45 | Normal Wear |
| Invention Sample 30 | 50 | Normal Wear |
| Invention Sample 31 | 50 | Normal Wear |
| Invention Sample 32 | 52 | Normal Wear |
| Invention Sample 33 | 51 | Normal Wear |
| Invention Sample 34 | 36 | Normal Wear |
| Invention Sample 35 | 38 | Normal Wear |
| Invention Sample 36 | 39 | Normal Wear |
| Invention Sample 37 | 39 | Normal Wear |
| Invention Sample 38 | 39 | Normal Wear |
| Invention Sample 39 | 38 | Normal Wear |
| Invention Sample 40 | 40 | Normal Wear |
| Invention Sample 41 | 42 | Normal Wear |

It was found, based on the results shown in Table 7, that a cubic boron nitride sintered body having a coating layer formed on the surface thereof is further excellent in cutting performance and has long tool life.

INDUSTRIAL APPLICABILITY

The cubic boron nitride sintered body of the present invention can extend the tool life compared to conventional ones due to excellent wear resistance and excellent fracture resistance, and is highly industrially applicable in that point.

What is claimed is:

1. A cubic boron nitride sintered body comprising cubic boron nitride and a binder phase, wherein a content of the cubic boron nitride is 81 volume % or more and 95 volume % or less based on a total amount of the sintered body, a content of the binder phase is 5 volume % or more and 19 volume % or less based on the total amount of the sintered body, a content of Al in the binder phase is 0.5 mass % or more and 5 mass % or less based on 100 mass % in total of all elements contained in the sintered body, a content of W in the binder phase is 2 mass % or more and 10 mass % or less based on 100 mass % in total of all the elements contained in the sintered body, a content of V in the binder phase is 2 mass % or more and 8 mass % or less based on 100 mass % in total of all the elements contained in the sintered body, a content of Cr in the binder phase is 0 mass % or more and 5 mass % or less based on 100 mass % in total of all the elements contained in the sintered body, and in the binder phase, a ratio of a content (volume %) of a first material S1 composed of a compound containing W to a total content (volume %) of the first material S1 and a second material S2 composed of a compound being free of W and containing V, (S1/(S1+S2)), is 0.35 or more and 1 or less.

2. The cubic boron nitride sintered body according to claim 1, wherein the total content (volume %) of the first material S1 and the second material S2 is 35 volume % or more and 97 volume % or less based on a total amount of the binder phase.

3. The cubic boron nitride sintered body according to claim 1, wherein an average particle size of the cubic boron nitride is 0.5 μm or more and 3.0 μm or less.

4. A coated cubic boron nitride sintered body comprising the cubic boron nitride sintered body according to claim 1 and a coating layer formed on a surface of the cubic boron nitride sintered body, wherein an average thickness of the coating layer is 0.5 μm or more and 5.0 μm or less.

5. The cubic boron nitride sintered body according to claim 2, wherein an average particle size of the cubic boron nitride is 0.5 μm or more and 3.0 μm or less.

6. A coated cubic boron nitride sintered body comprising the cubic boron nitride sintered body according to claim 2 and a coating layer formed on a surface of the cubic boron nitride sintered body, wherein an average thickness of the coating layer is 0.5 μm or more and 5.0 μm or less.

7. A coated cubic boron nitride sintered body comprising the cubic boron nitride sintered body according to claim 3 and a coating layer formed on a surface of the cubic boron nitride sintered body, wherein an average thickness of the coating layer is 0.5 μm or more and 5.0 μm or less.

8. A coated cubic boron nitride sintered body comprising the cubic boron nitride sintered body according to claim 5 and a coating layer formed on a surface of the cubic boron nitride sintered body, wherein an average thickness of the coating layer is 0.5 μm or more and 5.0 μm or less.

* * * * *